United States Patent
McClure

[11] Patent Number: 5,923,731
[45] Date of Patent: Jul. 13, 1999

[54] TELEPHONE MONITORING AND ALARM DEVICE

[75] Inventor: William C. McClure, Aurora, Colo.

[73] Assignee: Command Communications, Inc., Aurora, Colo.

[21] Appl. No.: 08/885,288

[22] Filed: Jun. 30, 1997

[51] Int. Cl.⁶ .......................... H04M 11/04; H04M 1/24
[52] U.S. Cl. ............................... 379/33; 379/43; 379/44; 379/37; 340/506; 340/541; 455/404
[58] Field of Search .......................... 379/1, 2, 10, 24, 379/26, 27, 29, 32, 33, 34, 39, 43, 44, 45, 46, 47, 37; 340/539, 540, 541, 571, 565, 506; 455/404, 166.2

[56] References Cited

U.S. PATENT DOCUMENTS

| | | |
|---|---|---|
| 3,177,480 | 4/1965 | Sankey . |
| 3,767,867 | 10/1973 | Altenberger . |
| 3,852,541 | 12/1974 | Altenberger ............................. 379/33 |
| 4,032,907 | 6/1977 | Young ..................................... 379/47 |
| 4,130,732 | 12/1978 | Giovagnoni ............................. 379/44 |
| 4,365,117 | 12/1982 | Curtis . |
| 4,425,480 | 1/1984 | Lischin . |
| 4,536,622 | 8/1985 | Rieman . |
| 4,641,127 | 2/1987 | Hogan et al. ............................ 379/40 |
| 4,686,700 | 8/1987 | Perry . |
| 4,731,810 | 3/1988 | Watkins ................................... 379/33 |
| 4,737,776 | 4/1988 | Wireman . |
| 4,918,717 | 4/1990 | Bissonnette et al. .................... 379/44 |
| 4,935,951 | 6/1990 | Robinson et al. . |
| 4,993,059 | 2/1991 | Smith et al. ............................. 379/39 |
| 5,056,131 | 10/1991 | Kanare et al. ........................... 379/33 |
| 5,128,979 | 7/1992 | Reich et al. ............................. 379/40 |
| 5,142,571 | 8/1992 | Suzuki et al. ............................. 379/2 |
| 5,365,568 | 11/1994 | Gilbert .................................... 379/43 |
| 5,390,249 | 2/1995 | Park . |
| 5,426,688 | 6/1995 | Anand . |
| 5,428,662 | 6/1995 | Hamilton . |
| 5,454,024 | 9/1995 | Lebowitz ................................. 379/40 |
| 5,517,547 | 5/1996 | Ladha et al. ............................. 379/39 |
| 5,598,456 | 1/1997 | Feinberg .................................. 379/43 |
| 5,630,209 | 5/1997 | Wizgall et al. .......................... 379/45 |
| 5,684,858 | 11/1997 | Hartmann et al. ...................... 379/33 |
| 5,686,885 | 11/1997 | Bergman ................................ 340/514 |
| 5,737,391 | 4/1998 | Dame et al. ............................. 379/33 |
| 5,745,849 | 4/1998 | Brittohn .................................. 379/40 |

Primary Examiner—Paul Loomis
Assistant Examiner—Rexford N. Barnie
Attorney, Agent, or Firm—Pittenger & Smith, P.C

[57] ABSTRACT

A telephone monitoring and alarm apparatus which has a telephone line sensing means which determines whether an incoming telephone line is cut or busy and alerts a user as to the status of the telephone line. Other sensing means detect the presence of fire, smoke, water, or other designated conditions and transmits a representative alarm signal to the apparatus. Upon receipt of an alarm indication from one of the sensing means or a line cut/line busy condition from the telephone line sensing means, a processing means disconnects the telephone extensions at the location from the incoming telephone line, and executes a predetermined response. This response can be visual alarms, audio alarms or dialing a predetermined telephone number and transmitting a predetermined alarm message. The apparatus can be programmed as to which telephone numbers to call and messages to send. Additionally, each apparatus has a unique programmable security address thereby preventing activation of the apparatus based upon another alarm condition at a near-by location. The alerting features of the apparatus can be manually activated by a telephone extension or a pendant.

5 Claims, 8 Drawing Sheets

Fig_1

DATA ACCESS ARRANGEMENT

LINE VOLTAGE DETECTOR

Fig_5

DTMF TRANSCEIVER & HANDSHAKE CIRCUITS & LOCAL PROGRAMMING EXTENSION

Fig-6

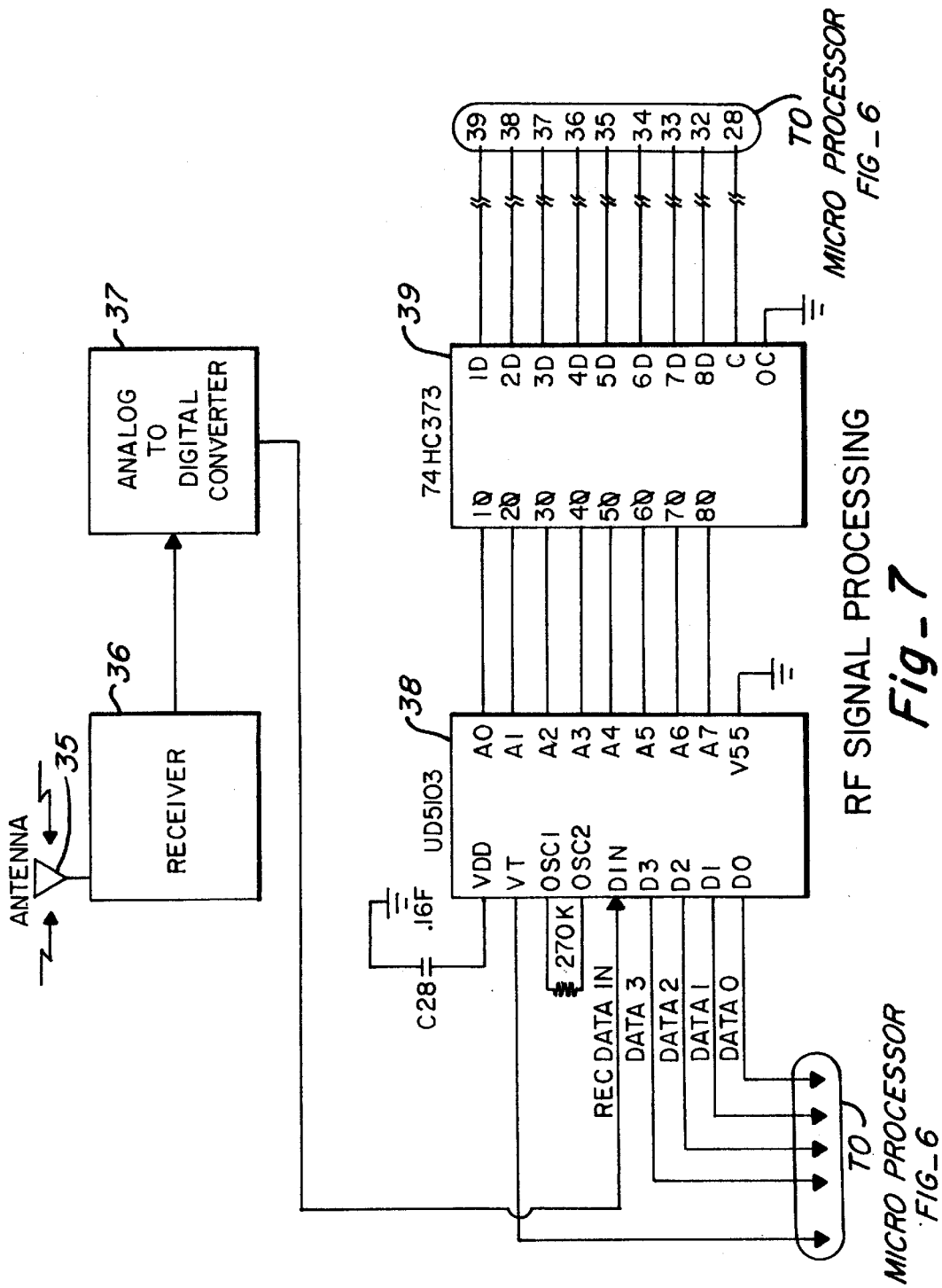

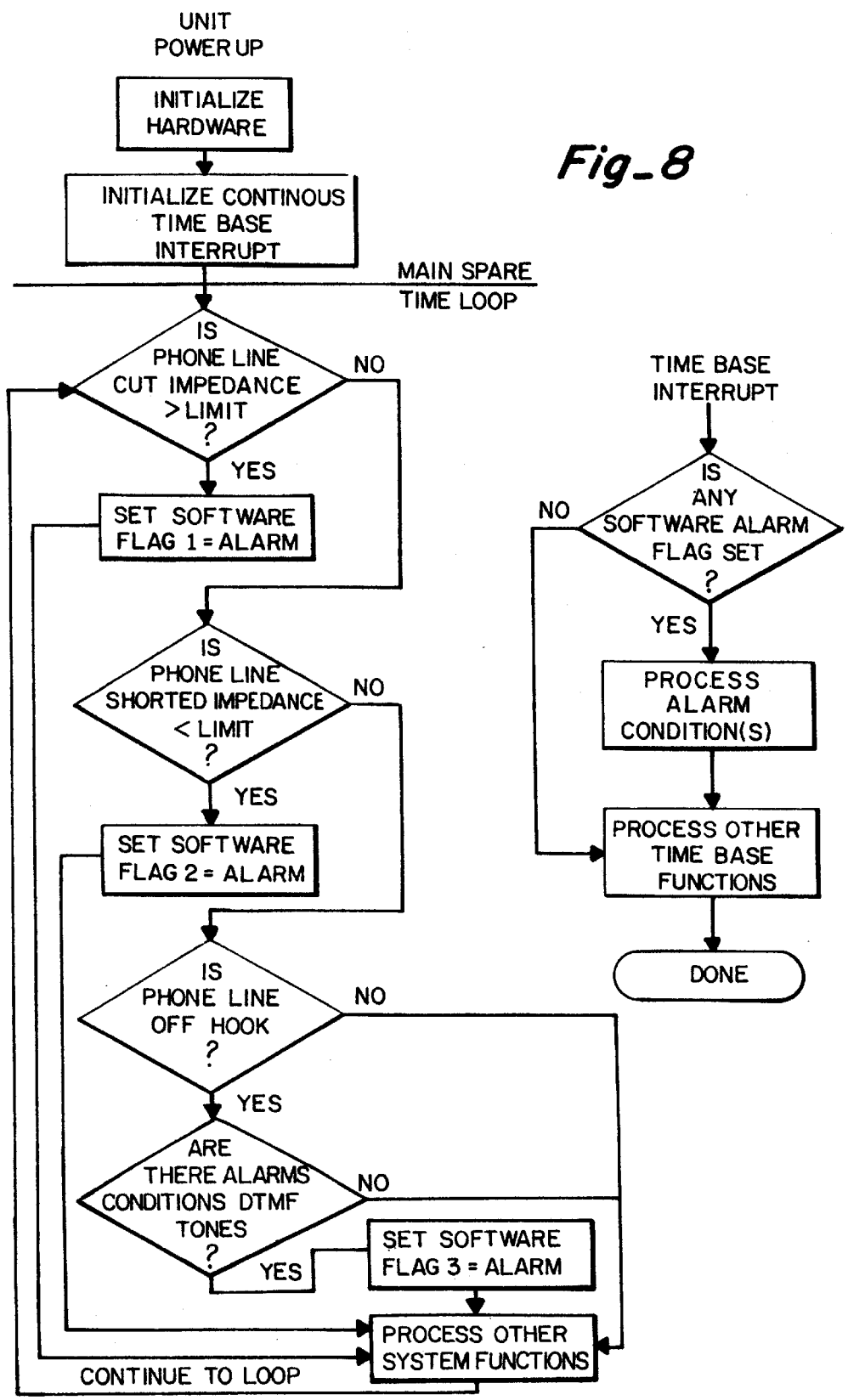
Fig_8

TELEPHONE MONITORING AND ALARM DEVICE

FIELD OF INVENTION

The subject invention addresses a need to detect and alert telephone users of a loss of available telephone communications, due to cut or shorted wires or unintentional off-hook circumstances, combined with an alert means for notification of an alarm company or an off-site station of a predetermined circumstance such as a medical emergency or menu of conditions definable by the user and variable as conditions change.

BACKGROUND OF THE INVENTION

The use of telephone base units to receive wireless or wired signals and transmit a notice to an alarm detection service is met by many medical alert companies.

The ability of the telephone company to notify the user of an off-hook circumstance—when there is no connection—by a tone notice from the off-hook phone is well known and experienced by most of the population.

However, both of these services are limited and have shortcomings. In the case of medical alerts, the signal is a single alert, to cover all circumstances. It requires that there be no off-hook phones or extensions and the alert is directed to one service provider for medical issues only.

The second service, notification of an off-hook circumstance, is limited in that the only phone to emit the signal is the one phone that is off-hook. Additionally, if a connection is made and left before the phone is off-hook, the signal will not be triggered. Thus, if the off-hook circumstances is at a phone in a remote place, the circumstance and the alert may not be noticed. Also, after some period of time if the alert goes undetected, the telephone company alert stops abandoning the notice of the off-hook circumstance. In circumstances where there is a connection but no conversation, there is no detection means other than contacting the telephone company to listen to the connection. If there is such a circumstance, the only way to notify or check on the user is to send someone to the residence.

In addition there are circumstances, such as cut telephone lines and shorted telephones lines that do not trigger any signal to alert the user of the problem. In most circumstances these conditions are detected only by a persistent neighbor or family member checking the circumstances that leads to the recognition of the problem.

The services that provide medical alert services must set up their alert protocols, with on-site set up of hardware with specific alert numbers. Inasmuch as the medical alert provides only one service, the protocol cannot be expanded or changed to accommodate other circumstance or even to change a notice telephone number, without an on-site change to the notification device. There is no off-site alternative to changing the notification, or the protocol to be followed. There is no method to reprogram or change the service that can be provided out of a menu that may be available. In addition, there is no way to remotely cut off service or reinstate service.

INFORMATION DISCLOSURE STATEMENT

The following information is provided in compliance with the inventor's duty to disclose all pertinent information which is relevant to the information which is the subject of this application. The listed patents are known to the applicant and are believed to be pertinent to the examination of this application.

The Robinson patent (U.S. Pat. No. 4,935,951) discloses a system for automatically illuminating an external light source upon the dialing of predetermined emergency phone numbers from a phone unit within the location. This patent does not discuss nor include the capabilities of the present invention, namely dead line detection, remote programming, and remote sensor activation of alarm and call out sequences. Additionally, the disclosed method of determining when an off- hook situation has occurred is extremely limited when compared to the present invention. This patent teaches off-hook detection which operates only upon removal of the handset from the associated base, whereas the present invention's off-hook detection capability applies to any down line phone extension within the location. As a result, the teaching of this patent does not apply to the invention which is herein disclosed.

SUMMARY OF THE INVENTION

An alert system is disclosed which combines automatic notification to a user at the home site of the existence of a cut or shorted telephone line and an off-hook circumstance, as well as notification to an off-site monitor of a plurality of user defined alarm circumstances initiated by the user or by system monitors determined and defined by the user and the monitoring company.

There are many well known monitoring devices, such as medical alert pendants and burglar or fire alarms, as well as alarms furnished by the telephone company that give an audible beep if a phone is left off-hook without a connection. However, each are separate services, that have shortcomings. In addition, there are no user monitors that detect cut line or shorted line circumstances or connected telephone calls without conversations [inactive connection].

The present invention addresses these shortcomings and combines all of the above services into a single unit. In addition, the invention provides for programmable memory, programmable from a remote control station, to allow the user or administrator to: select some or all of the available options; change options; or temporarily stop service, all without the necessity of a personal service call to the user's place of business or residence. Thus, as new options become available or as needed, the service through the system may be altered quickly and efficiently by a central administrator. This assists accounting with what service is or is not being used. In the event of nonpayment of fees, the service can be easily and quickly discontinued, again without the necessity of gaining access to the residence or business, and without interrupting separate telephone service.

The system includes a measuring device to check voltages on the telephone lines which detects circumstances such as cut telephone lines and off-hook conditions. It also has a monitoring system to detect voice activity and energy on an off-hook line [whether one sided or if inactive connection exists]. The present invention has an audible alarm, as well as visible alarms to show status and alarm conditions.

In addition to the alarm located at the user's location, the system has the ability to make a call out to a designated number or numbers upon the command from the microprocessor. There may be numerous numbers—each to be separately called in the event of a predetermined coded command input.

The microprocessor receives the input commands, whether they are hand initiated from an RF pendant, a panic button on the phone, detected on-site by a fire or burglar alarm or are automatically detected by the monitor functions of the system like fire, burglar alarm, and off-hook condition. The microprocessor then determines what action to command and effects the desired alarm transmission.

After the microprocessor determines the appropriate action, it retrieves data from the electronic program memory where telephone numbers and alarm messages are stored. The microprocessor, after retrieval of the data, proceeds to execute the alarm—whether by an audible alarm at the location or initiates a telephone call with a programmed number and text or a combination of these.

The system provides for protocols for data transmission—in the "off-site" alarm circumstance, which is similar to a fax system whereby there is notification, receipt of response, hand shake, and the transmission of the alarm data with such information as who, where, a particular code, alarm status, and account code. There can be up to 20 different alarm conditions programmed. Additionally, at the conclusion of the alarm message, the end command and cut off commands are initiated. At this point, final confirmation of receipt is enunciated.

The microprocessor monitors the connection and awaits confirmation of receipt. Without the confirmation the microprocessor keeps trying to connect and send the message.

As for the off-hook monitor, the system starts monitoring each phone upon pick-up. It does not interfere with answering machines or any other device attached to the telephone line. It detects energy in the audio spectrum. If there is none, the microprocessor determines there is an off-hook condition and initiates a timer for 2-½ minutes. If, on the other hand, energy is detected, the timer is advanced 2-½ minutes and is reset. Constant monitoring of the system can be made. The timer weights audible energy as two times the value of the absence of audible energy.

Within the system, the requirements of commercial burglar alarm companies to have an RJ 31 switch to command the line is provided.

The system also provides a watchdog timer to reinitialize the system at periodic times to insure that the system is always initialized and ready.

The pendant alarm system incorporates an RF signal for transmission from the pendant to a receiver in the system. The receiver contains a decoder with address and data ports. The system also allows the alarm to be reset within a determined period of time after initialization but before the alarm is sent to enable the user to cancel an inadvertent and erroneous alarm initialization.

BRIEF DESCRIPTION OF THE DRAWINGS

Objects, features and advantages of the invention, its organization, construction and operation will be best understood from the following detailed descriptions taken in conjunction with the accompanying drawings of which:

FIG. 6 is a schematic diagram of the microprocessor interfaces;

FIG. 7 is a schematic diagram of the RF signal processing circuit; and

FIG. 8 is a flow diagram of the alarm analysis and functions performed by the invention.

DETAILED DESCRIPTION OF THE INVENTION

The present unit is connected in series with the user's incoming telephone line and operates to control down line phones. There is an auxiliary phone jack 11 on the main control unit 12 to connect a phone directly to the unit.

The present arrangement allows for 13 RF channels. The zero channel is for a pendant signal device that can be worn around the neck of the user. The initiation of this signal activates a programmed sequence of call out and message forwarding events. Of the remaining RF channels, 8 channels have dial out capabilities and 4 channels do not have dialout capabilities. These channels may be used for fire, CO detection, water detection, burglar or intrusion alarms, or other uses that can be defined and programmed. At the main control unit 12 there is an LED readout 9 for signaling three pre-programmed conditions: (1) green will be displayed when there is no alarm condition; (2) the LED will flash if the system is unable to dial out due to a cut line or a busy line; (3) red is displayed when an alarm condition is detected; and, (4) if both green and red are displayed, the unit's nonvolatile memory is not properly programmed and needs attention. The nonvolatile memory can be programmed remotely and simultaneously with a telephone connection between an off-site telephone and the users telephone.

Figure 1:
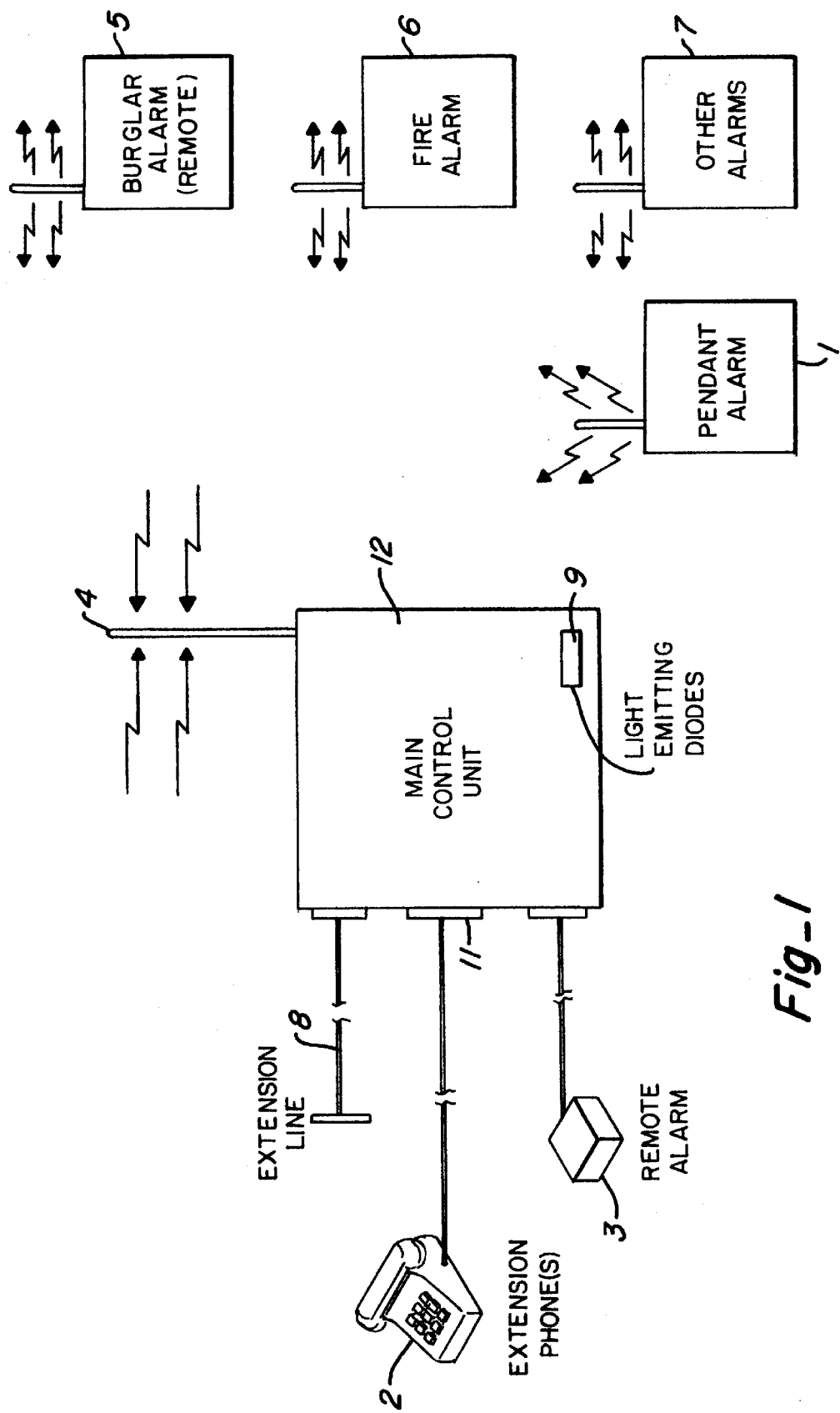
FIG. 1 is a pictorial representation of the alarm monitoring system according to the present invention.

FIG. 1 shows a pictorial representation of the present emergency system. The main control unit 12 is connected directly to the incoming telephone line 8. From the main control unit 12, outputs are provided to connect the phone line to the remainder of the extension phones within the location. Additionally, a phone extension can be directly connected to the main unit. Also shown, are the remote units and the capability of the system to receive alarm signals from remote locations, including pendants, via RF signals.

Figure 2:
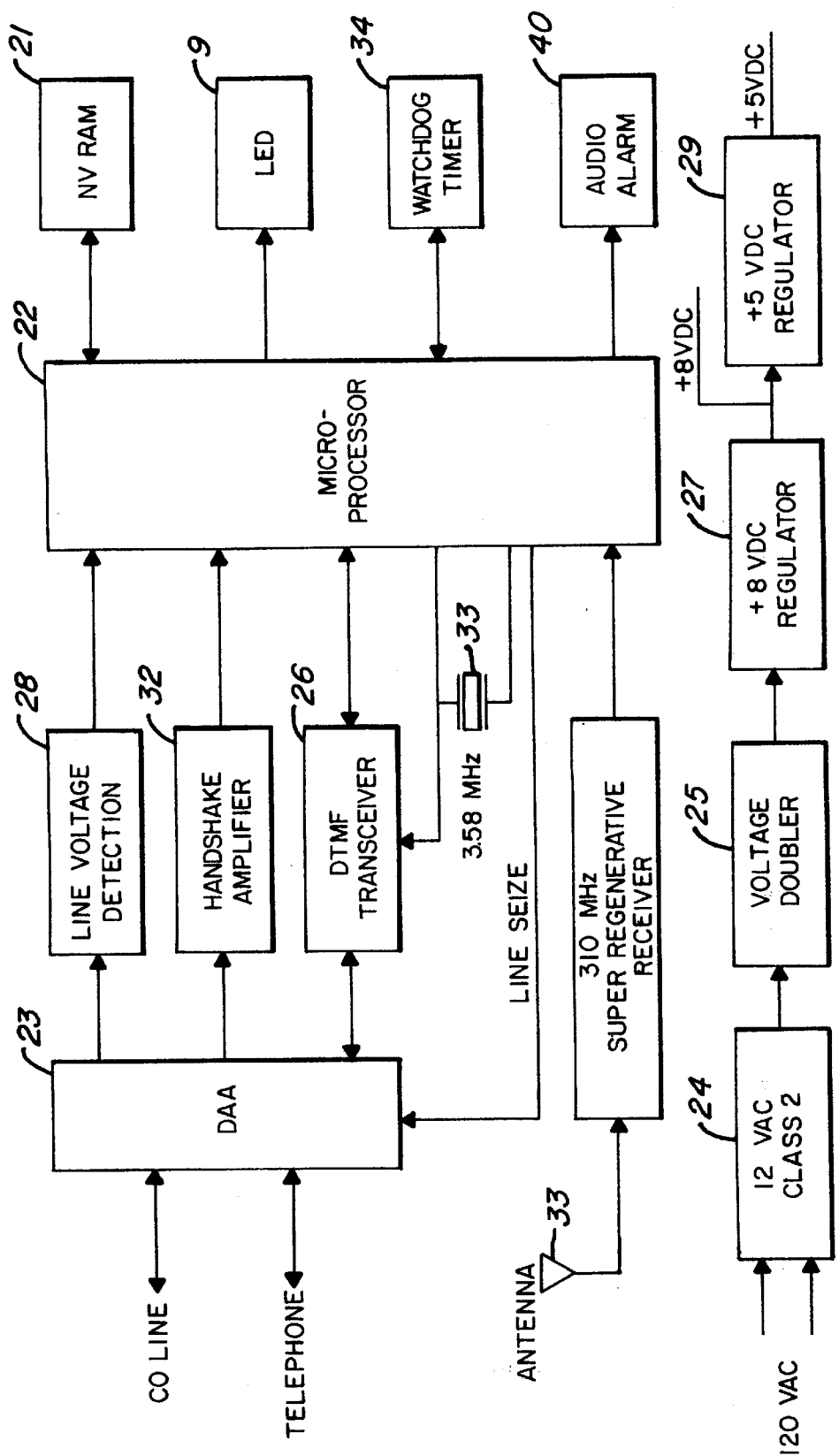
FIG. 2 is a block diagram of the module construction of the various features of the apparatus.

FIG. 2 is a block diagram of the various components of the main control unit 12. The main control unit 12 is connected via an RJ 31 connector to an incoming telephone line 9 with connections to the selected alarm or alarm monitoring company such as burglar alarm companies or other types. The RJ 31 connector allows the alarm monitoring company to take control of the main control unit 12, if necessary. In FIG. 2 there are representations for the major components of the main control unit 12. Connected directly to the telephone line are the data access arrangement (DAA) 23 components.

Figure 3:
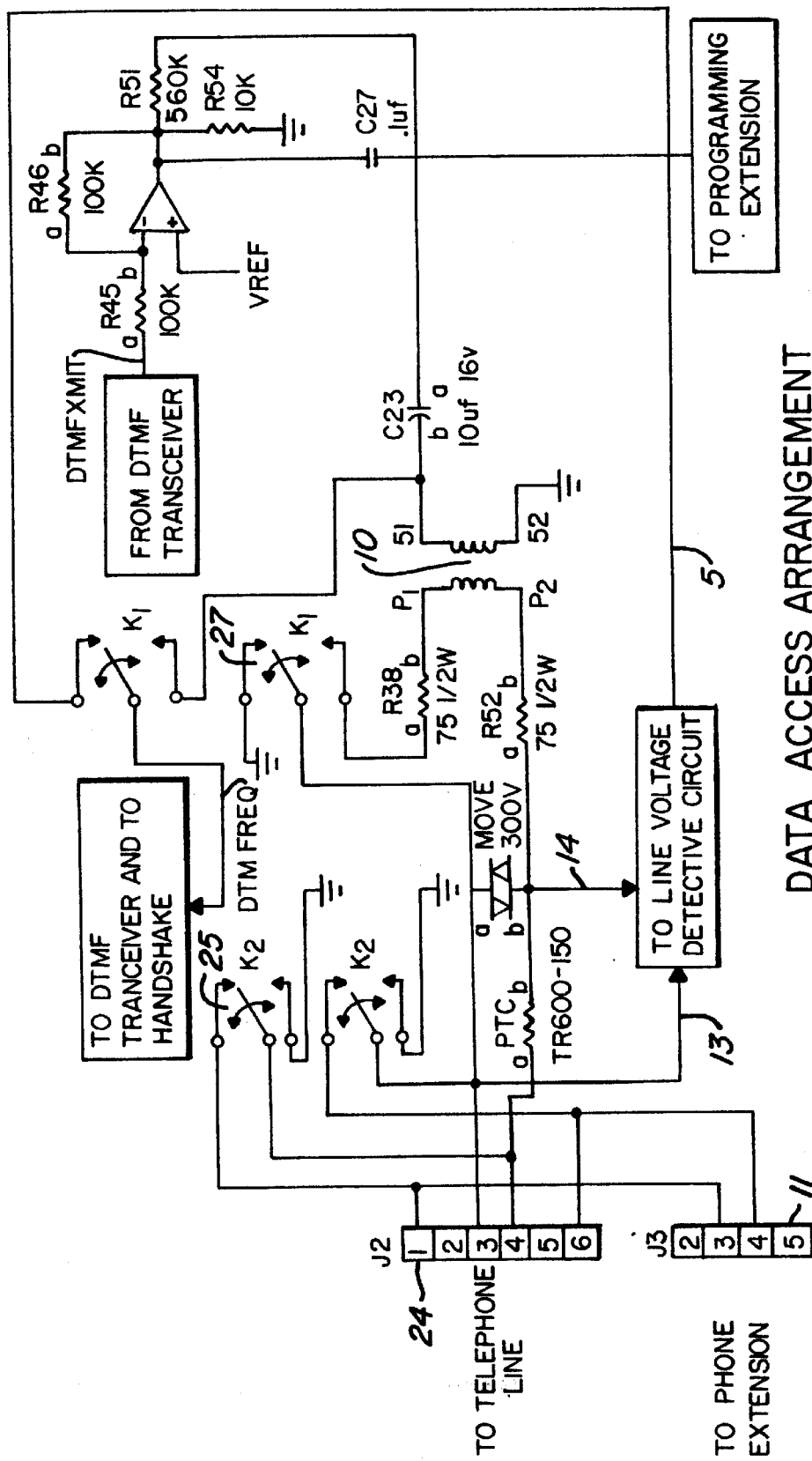
FIG. 3 is a schematic diagram of the data access arrangement circuit.

The DAA circuit 23 is shown in FIG. 3. The incoming phone line is connected via the RJ31 jack to the input jack, J2 24. The telephone signal arrives at the unit on J2 pins 3 and 4. The relay K2 25 allows the entire location to be disconnected from the telephone line. When the K2 relay 25 is switched into its down position, the incoming phone lines at J2, pins 3 and 4 are grounded. The K2 relay's 25 position is switched down whenever the microprocessor 22 sends out a signal on the L/S1 line shown in FIG. 6. Disconnecting the main control unit 12 from the incoming telephone line 8 allows the system to seize control of the incoming telephone line 8 for sending out alarm messages. When the K2 relay 25 is switched up, the incoming telephone line 8 is connected to J2 24 pins 1 and 6, thereby allowing connection to alarm systems utilizing pins 1 and 6. The telephone line is also connected to the rest of the phone circuit via J3 11. Additionally, the telephone line is connected to the line voltage detector circuit 20.

The telephone line is also connected to the DTMF transceiver 26. The transformer 10 allows reception and transmission of DTMF signals. Also, the unit can be directly programmed by DTMF tones generated by the Programming Extension. The unit can be disconnected from the telephone circuit by switching the K1 relay 27 to the up position. Switching the K1 relay 27 to the up position grounds the telephone input signal on J2 24, pin 3, thereby disconnecting the system from the incoming telephone line 8. The K1 relay 27 is switched up whenever the microprocessor 22 sends out a signal on the L/S line shown in FIG. 6.

Figure 4:
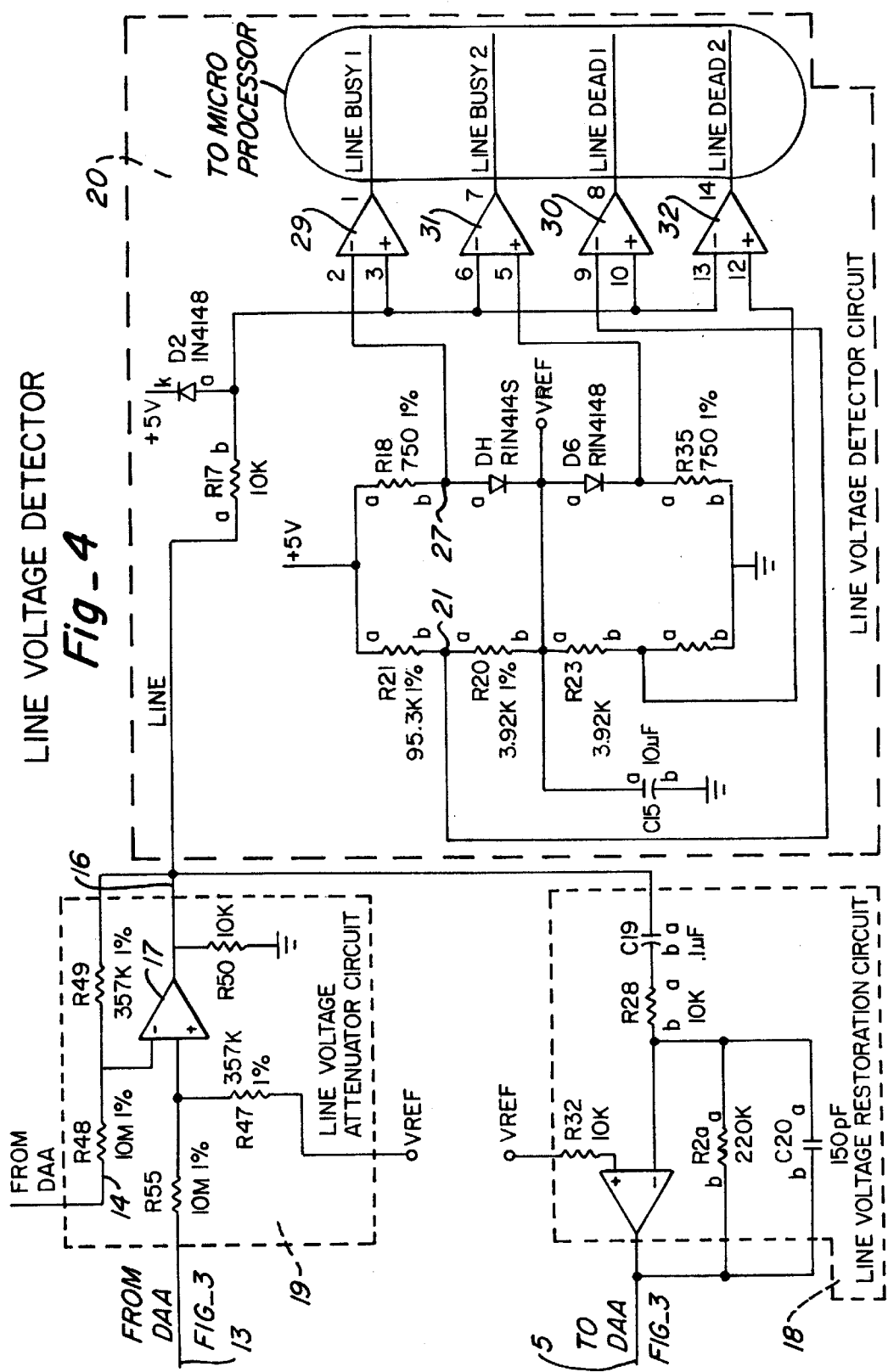
FIG. 4 is a schematic diagram of the line voltage detector circuit.

Connected to the DAA 23 and connecting it with the microprocessor 22 are line voltage detection 28, energy detection components on the line busy side of the line voltage detection 28, and a direct connection to the microprocessor from the line voltage detection 28 for the line dead voltage detection. The line voltage detection 28 is shown and detailed in FIG. 4.

The telephone signal first enters the line voltage attenuator circuit 19 on two lines 13 and 14. First, the telephone line voltage is attenuated by the circuit shown. The voltage is attenuated from 48 volts to approximately 2 volts at the output of the opamp 17. The 2 volt signal is then routed on line 16 to the line voltage detector circuit 20, and to a line voltage restoration circuit 18. The line voltage restoration circuit 18 restores the telephone signal coming into the Line voltage detector on line 14 to its original 48 volts.

Upon attenuation in the line voltage attenuator circuit 19 the telephone signal is next compared to reference voltages to determine whether the line is "off-hook". The line voltage detector circuit 20 includes a voltage splitting device that takes the 5 volts reference voltage and taps off at 0.6 drops in each of the first two taps. This equates, in the 48 volt telephone voltage to approximately 18 volts which on a full voltage telephone line equates to an off-hook circumstance. Two taps are taken rather than using a rectifier in the described embodiment though use of a rectifier to ensure the voltage tap-off of the upper voltage is satisfactory. Both of the first taps are fed into two operational amplifiers (opamp) 29 and 30 configured for voltage comparison purposes. The comparison through both is alternately to accommodate the positive or negative voltage and compared with the line voltage that has previously been reduced to the same spectral range of voltages where 5 volts would equate to 48 volts and 18 volts would equate to the line busy voltage that is tapped-off the voltage splitter. Additionally there are two opamps 31 and 32 again to accommodate the potential for reversed polarities to determine if the line voltage is equivalent to a line dead circumstance or something less than 18 volts. Again, the second opamps 31 and 32 are reversed to cover the circumstances of reversed polarity.

Figure 5:
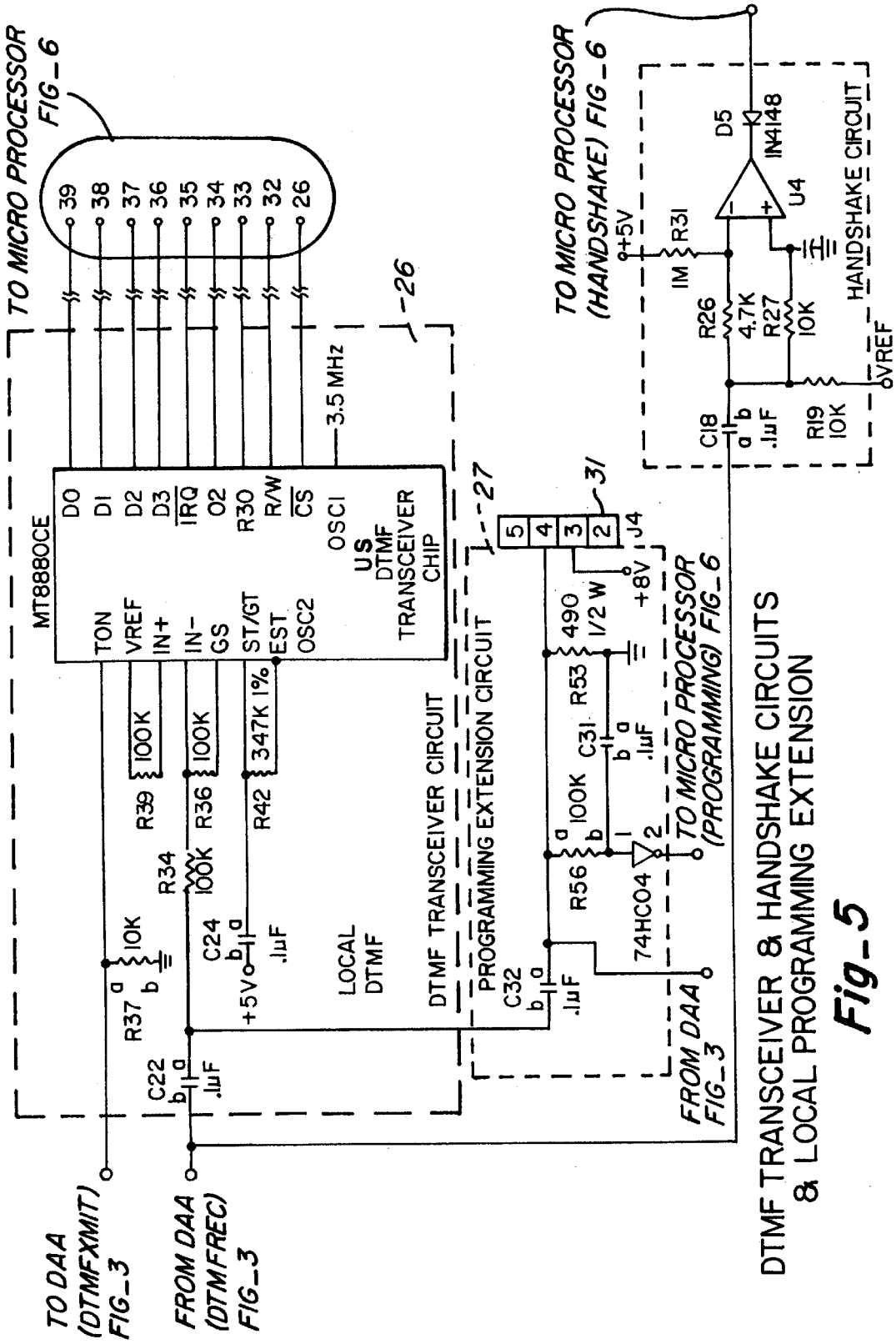
FIG. 5 is a schematic diagram of the DTMF transceiver, local programming extension, and handshake circuits.

The outputs of the four opamps 29, 30, 31, 32 in the line voltage detector circuit 20 are routed to the microprocessor 22. Only one of the four opamps should generate a signal at any particular time. Thus, through the opamp voltage comparison circuitry the microprocessor 22 is informed of the status of the telephone line at all times. Additionally, within the microprocessor 22 an energy detection capability exists to detect energy in the audible range. Also connected to the DAA 23 is the DTMF transceiver circuit 26 as shown in FIG. 5. This circuit allows for the reception of DTMF tones from the telephone line and from a programming extension circuit 27 which can be accessed via a handset through jack J4 31. The DTMF tones are used to program the various features of the control unit. The DTMF transceiver 26 also receives inputs from the microprocessor 22. These inputs are converted to tones for transmission to the alarm company or service provider. Additionally, a handshake circuit 32 is connected to the DAA 23. The handshake circuit 32 detects tones from either the alarm company or the service provider during programming or during alarm signals. The DTMF transceiver 26 provides a two-way connection between the DAA 23 (and ultimately the alarm company or service provider) and the microprocessor 22.

The microprocessor 22, as shown in FIG. 2, connects to the DTMF transceiver 26 additionally with a 3.58 MHz signal 33 for purposes of generating the DTMF signal for both the transmit and receive sections of the DTMF transceiver 26. Additionally, the microprocessor 26 is connected to the DAA 23 with a line seize circuit that allows the control unit to take over control from any down line phone in order to call in an alarm circumstance.

Figure 6:
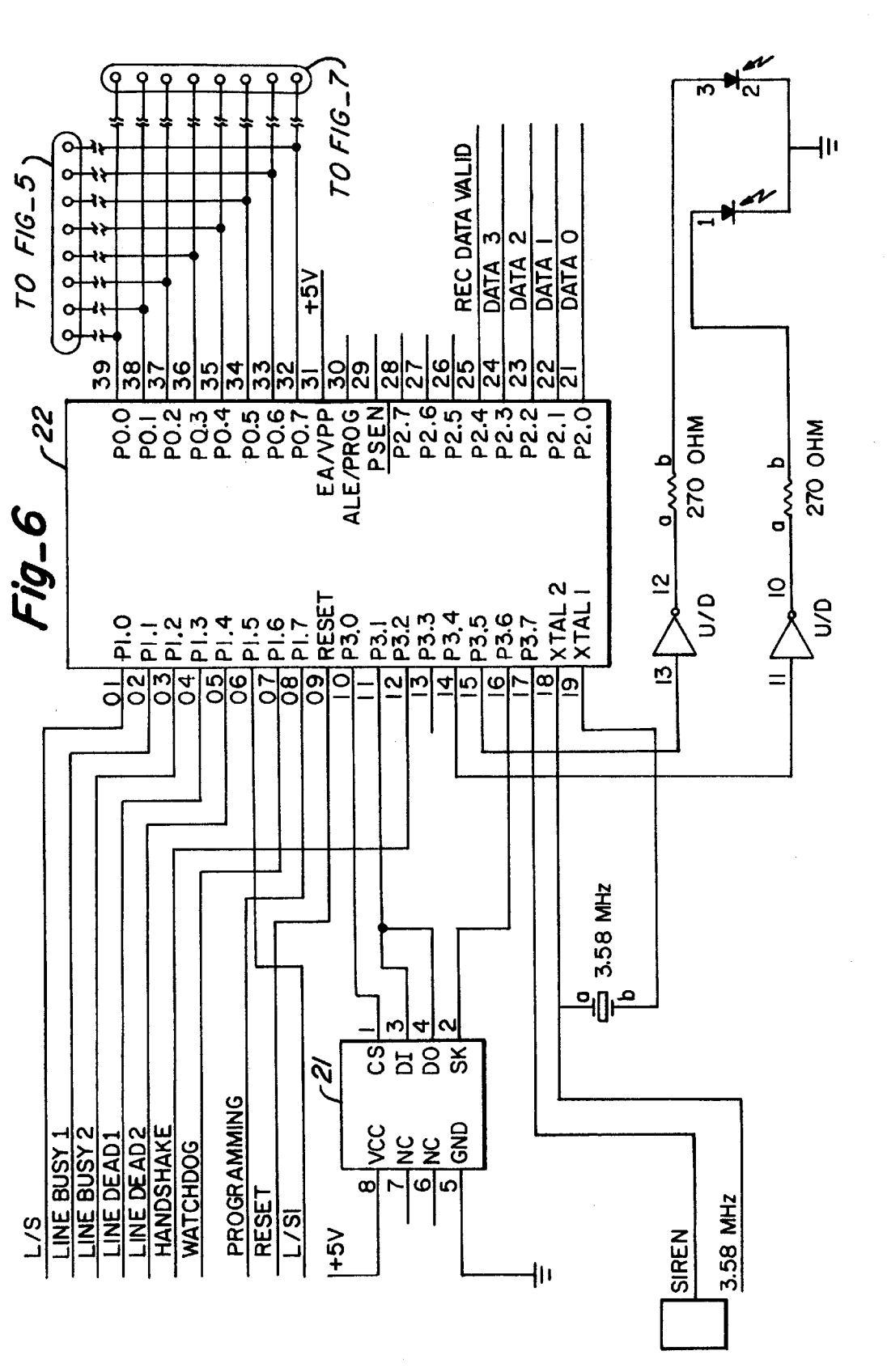

FIG. 6 shows the microprocessor and its numerous connections. Non-volatile random access memory (NVRAM) 21 is provided and connected to the microprocessor 22. The NVRAM 21 stores start-up configurations, phone numbers, and other information used by the microprocessor 22. Also, connected to the microprocessor 22 is a watchdog timer. The watchdog timer 34 will automatically reset the microprocessor 22 if the processor fails to update the watchdog timer 34 by sending a "watchdog" signal within a predetermined time period. When the watchdog timer 34 reinitializes the microprocessor 22 it utilizes the data residing within the non-volatile memory 21. Thus, if no "watchdog" signal is generated the watchdog timer 34 will automatically reset the microprocessor 22 and thereby prevent the processor from getting locked in a closed loop process.

The apparatus receives signals from alarm stations that are wireless connected or hard wire connected to the control unit. The unit contains RF reception and processing circuitry, see FIG. 7. This circuitry includes an antenna 35, receiver 36, analog to digital converter 37, multiplexer 38, and address register 39.

Each remote sensor is assigned a specific address. Additionally, each control unit has a unique address which allows for discrimination between alarm signals sent by the location's sensor and other near location sensors. The address for each control unit is fully programmable.

Also provided in this invention is an alarm outlet 40. The alarm outlet allows the microprocessor to initiate either an audible, visual, or both alarm at the location of the unit. An LED readout 9 shows whether or not the unit has been programmed, and, if programmed, whether it is in a ready condition.

Through the microprocessor 22 there is a timer that triggers an off-hook alarm circumstance in the event the comparators have determined that the voltage of the line is consistent with an off-hook condition and the energy detection circuit detects no audible energy for 2-½ minutes. Thus it accommodates sporadic talking over a valid connected telephone line where the energy detection circuit adds time in the event of conversation being heard.

The operational sequence of the system is as follows:

At power up, the main control unit 12 will read the data stored in the nonvolatile memory 21. This data will include the customer's account number, the alarm service provider's phone number, the phone line type, pulse or tone, and the RF pendant dip switch address. At power up, if the nonvolatile memory 21 has not been programmed, the unit will reflect this in the LED 9 signal. The unit will still operate to detect lines which are out or busy, and reserved alarms while initiating only a local alarm. Reserved alarms include any pendant alarm, panic alarm from any other phone, or any dial-out alarm circumstance. The unit may be tested by activation of the test reset mode through the pendant button. The test will cut off the audio and LED alarm accordingly, and terminate at the time out condition for the test. Upon detection of a cut or shorted phone line for 30 seconds or more, a line dead alarm condition will be set. In the event of an off-hook condition and the central office generates an off-hook tone, the alarm will be in a line busy condition. The unit will continuously scan for these conditions. Once either of these alarms are triggered, the pendant button can partially reset the unit and silence the audio alarm. Full reset occurs once the fault is corrected. Either of these alarms will override an alarm due to lack of program data or non-programmed condition.

A panic dial out or non-dial out alarm will override a line dead or line busy alarm. In the circumstance of a dial out alarm, the dial out will fail and eventually the line dead or line busy alarm will resume.

A panic alarm is initiated by the pendant button or a phone input of "##" or "**". The audio and LED panic alarm will start after a 16 second time delay for the pendant and a 30 second delay for a telephone signal. The control unit will start the dial out process. It will test for line dead, line busy and not programmed conditions. If any of these tests fail a dial out error is signaled. The panic alarm can be canceled by depressing the RF button on the pendant to enter the test reset mode. If the panic alarm has been triggered by the phone set, the alarm can be canceled and reset by any DTMF signal other than "#" or "*".

In dial out alarm the unit will disconnect all down line phones long enough to stabilize the dial tone before initializing the dial out procedure. The dial out procedure initiates an off-hook status and begins the dial out, with the data from the non-volatile memory. The unit will silence the audio alarm. It will scan for dial tone and, whether detected or not, initialize the dialing after 4 seconds. If the NVRAM is not programmed the dial out is aborted. After dialing out, the system takes a 40 second time out during which time the alarm company answers and initiates a handshake tone of 1400 and 2300 Hz.

Once the handshake tones are detected and handshake is established, the alarm status is sent using the Ademco high speed format. The service then responds with a 1400 Hz tone. If time out is exceeded, the dial out is aborted. The alarm data is sent in the XXXXXXXXY format twice with a one second pause between bursts; where X=5 if no alarm, 1=alarm status 0 through 8, and 4 for RF alarm addresses 8 through 15. A termination signal is always sent as Y=7. After the message has been transmitted a second time, the final termination signal is sent to disconnect.

After termination the unit waits 2 seconds in order to stabilize the phone line and then reconnects all down line phones. In the event there was an aborted dial out or time out the unit will retry until the retry time has been exceeded and then go to an on hook status with the dial out error alarm. In this circumstance the dial out error alarm sounds and down line phones are not reconnected. Once a successful dial out has occurred, the audio alarm is silenced.

For programming, the control unit listens for DTMF signals while any phone is off-hook and there is no alarm circumstance. All programming can be changed as many times as needed. Programming is terminated when the correct length character string is entered with a correct check sum and terminator signal. The program is also checked by a time out switch to insure programming is done within the proper length of time. In the event a programming attempt fails, the previous data in the program is preserved and reloaded. In a failed programming circumstance the programmer will receive a single "7" acknowledgment. If the programing is successful a "77" is sent.

The program sequence is secure due to a combination of the following unique header and termination signals, running check sum, any character out of range, and timeout sequences.

While an emergency alerting system has been shown and described in detail in this application, it is to be understood that this invention is not to be limited to the exact form and process disclosed and that changes in the detail and construction may be made without departing from the spirit thereof.

What is claimed is:

1. A telephone monitoring and alarm apparatus which monitors a telephone line entering a user's location and other alarms for recognition of conditions predetermined by the user and initiates a programmable response, the monitoring and alarm apparatus comprising;

a) telephone line sensing means for sensing the voltage upon a telephone line and determining whether the telephone line is busy or cut and providing an output indicative thereof;

b) a second sensing means for detecting the occurrence of a predetermined event;

c) a signal reception means to receive signals from a remote sensing means;

d) a processing means for processing and prioritizing inputs, retrieving information from an information storage means, and implementing programs and instructions contained in said information and transmitting alert messages;

e) a programming means to program information to be utilized upon the occurrence of a predetermined condition by said processing means;

f) an information storage means to store information provided by said programming means for later retrieval by said processing means;

g) an alerting means which upon receipt of said alert messages from said processing means notifies predetermined locations or users;

h) a system status display means which displays the operating status of said telephone monitoring and alarm apparatus as determined by said processing means;

i) a power supply means for providing power to all components of said telephone monitoring and alarm apparatus;

j) an attenuation means for attenuating the incoming telephone line signal so as to provide an output suitable for further processing;

k) a polarity compensating means and voltage comparison means for comparing the signal strength on the telephone line against a predetermined reference voltage to determine whether the telephone line is busy or cut and providing an output indicative thereof; and l) said voltage comparison means is a voltage dividing network connected to four op amps such that a line voltage within a predetermined range indicates the telephone line is busy while a line voltage less than a predetermined value indicates the telephone line is cut, said polarity compensation means is accomplished by two op amps configured for a positive polarity telephone line signal while the remaining two op amps are configured for a negative polarity telephone line signal.

2. A telephone monitoring and alarm apparatus which monitors a telephone line entering a user's location and other alarms for the recognition of conditions predetermined by the user and initiates a programmable response, the monitoring and alarm apparatus comprising;

a) a telephone line sensing means for sensing the voltage upon a telephone line and determining whether the telephone line is busy or cut and providing an output indicative thereof;

b) a second sensing means for detecting the occurrence of a predetermined event;

c) a signal reception means to receive signals from a remote sensing means;

d) a processing means for processing and prioritizing inputs, retrieving information from an information storage means, and implementing programs and instructions contained in said information and transmitting alert messages;

e) a programming means to program information to be utilized upon the occurrence of a predetermined condition by said processing means;

f) an information storage means to store information provided by said programming means for later retrieval by said processing means;

g) an alerting means which upon receipt of said alert messages from said processing means notifies predetermined locations and users;

h) a system status display means which displays the operating status of said telephone monitoring and alarm apparatus as determined by said processing means;

i) a power supply means for providing power to all components of said telephone monitoring and alarm apparatus;

j) a radio frequency reception means for receiving radio frequency signals generated by said sensing means and providing a received signal output;

k) a signal conversion means which converts said received signal output into a format suitable for further digital processing and generates a stream on digital signal bits; and l) a digital word restoration and comparison means which restores said stream of digital signal bits into a digital word of predetermined length, compares said digital word against a preselected programmable verification code, outputs a digital word of predetermined length, and generates a received data valid signal when said digital word matches said preselected programmable verification code.

3. The telephone line monitoring and alarm apparatus of claim 2 wherein said radio frequency reception means is accomplished by an RF antenna tuned to receive the radio frequency signal generated by said sensing means.

4. The telephone line monitoring and alarm apparatus of claim 2 wherein said signal conversion means consists of an analog to digital converter which converts said amplified received signal output into a digital stream and provides a digital output.

5. The telephone line monitoring and alarm apparatus of claim 2 wherein said digital word restoration and comparison means is accomplished by a device which receives said stream of digital signal bits, compares said bits against a predetermined address to verify only preselected sensing means are going to be processed, de-multiplexes incoming digital signal bits, and generates a four bit word and a received data valid signal.

* * * * *